United States Patent
Schwarze et al.

(10) Patent No.: US 10,124,537 B2
(45) Date of Patent: Nov. 13, 2018

(54) APPARATUS AND METHOD FOR PRODUCING THREE-DIMENSIONAL WORK PIECES WITH A RADIATION DETECTION DEVICE

(71) Applicant: SLM Solutions Group AG, Luebeck (DE)

(72) Inventors: Dieter Schwarze, Luebeck (DE); Daniel Alberts, Luebeck (DE)

(73) Assignee: SLM Solutions Group AG, Luebeck (DE)

(*) Notice: Subject to any disclaimer, the term of this patent is extended or adjusted under 35 U.S.C. 154(b) by 599 days.

(21) Appl. No.: 14/558,266

(22) Filed: Dec. 2, 2014

(65) Prior Publication Data
US 2015/0183158 A1   Jul. 2, 2015

(30) Foreign Application Priority Data
Dec. 2, 2013   (EP) .................................... 13195313

(51) Int. Cl.
   *B29C 67/00*    (2017.01)
   *B22F 3/105*    (2006.01)
   (Continued)

(52) U.S. Cl.
   CPC ........ *B29C 67/0051* (2013.01); *B22F 3/1055* (2013.01); *B29C 67/0077* (2013.01);
   (Continued)

(58) Field of Classification Search
   CPC ......... B33Y 10/00; B33Y 30/00; B33Y 50/00; B33Y 50/02
   See application file for complete search history.

(56) References Cited

U.S. PATENT DOCUMENTS

| | | |
|---|---|---|
| 4,863,538 A | 9/1989 | Deckard |
| 6,406,658 B1 * | 6/2002 | Manners ................. B29C 64/40 |
| | | 264/401 |

(Continued)

FOREIGN PATENT DOCUMENTS

| | | |
|---|---|---|
| EP | 1793979 | 4/2014 |
| EP | 2335848 | 10/2014 |

(Continued)

OTHER PUBLICATIONS

EP Search Report, EP Appln. No. 13195313.5, dated Jun. 6, 2014, 6 pgs.

(Continued)

*Primary Examiner* — Ryan M Ochylski
(74) *Attorney, Agent, or Firm* — Taft Stettinius & Hollister LLP

(57) ABSTRACT

An apparatus (10) for producing three-dimensional work pieces comprises a carrier (12) adapted to receive a raw material powder (14). The apparatus (10) further comprises an irradiation unit (20) for selectively irradiating electromagnetic or particle radiation onto the raw material powder (14) applied onto the carrier (12) in order to produce a work piece made of said raw material powder (14) by a generative layer construction method. The irradiation unit (20) comprises a radiation source (22) and a plurality of optical elements. A detection device (34) of the apparatus (10) is arranged so as to be capable of detecting an operational parameter of a radiation beam (26) emitted by the radiation source (22) and having passed at least one optical element of the irradiation unit (20).

10 Claims, 2 Drawing Sheets

Figure 1:
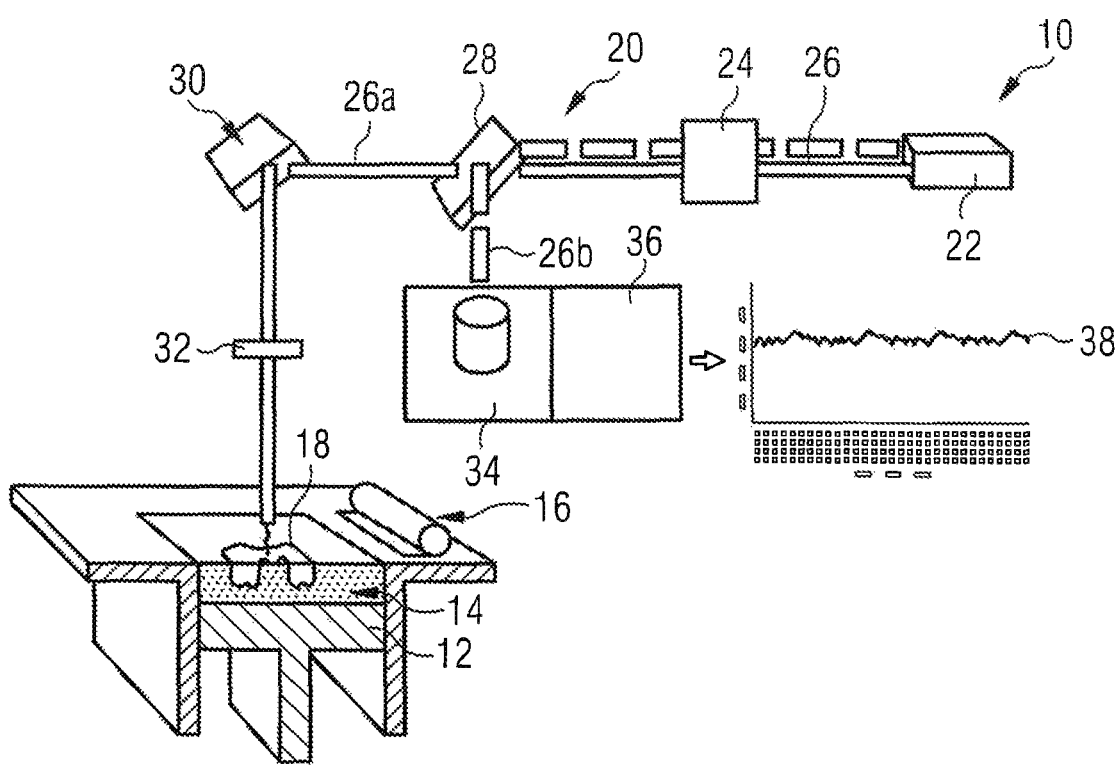

(51) Int. Cl.
*B33Y 30/00* (2015.01)
*B33Y 50/02* (2015.01)
*B33Y 10/00* (2015.01)
*B29L 31/00* (2006.01)

(52) U.S. Cl.
CPC .......... *B29C 67/0088* (2013.01); *B33Y 30/00* (2014.12); *B33Y 50/02* (2014.12); *B22F 2003/1056* (2013.01); *B29L 2031/00* (2013.01); *B33Y 10/00* (2014.12); *Y02P 10/295* (2015.11)

(56) References Cited

U.S. PATENT DOCUMENTS

| | | | |
|---|---|---|---|
| 7,339,712 | B2 | 3/2008 | Kerekes et al. |
| 2004/0190583 | A1* | 9/2004 | Tojo ............ H01S 3/0627 372/98 |
| 2006/0215246 | A1 | 9/2006 | Kerekes et al. |
| 2011/0001950 | A1* | 1/2011 | DeVoe ............ G03F 7/2053 355/67 |
| 2012/0138586 | A1* | 6/2012 | Webster ............ A61B 18/20 219/121.64 |
| 2013/0064706 | A1 | 3/2013 | Schwarze |
| 2013/0154160 | A1 | 6/2013 | Cooper |
| 2014/0132952 | A1* | 5/2014 | Zhu ............ G03F 7/70591 356/124 |

FOREIGN PATENT DOCUMENTS

| | | |
|---|---|---|
| JP | 2006323361 A | 11/2006 |
| JP | 2008128987 A | 6/2008 |
| JP | 2009160861 A | 7/2009 |

OTHER PUBLICATIONS

Office Action, JP2014-241625, dated Sep. 6, 2016, with partial translation, 7 pages.
Decision of Refusal, JP2014-241625, dated Feb. 7, 2017, with partial translation, 7 pages.

* cited by examiner

APPARATUS AND METHOD FOR PRODUCING THREE-DIMENSIONAL WORK PIECES WITH A RADIATION DETECTION DEVICE

The present invention relates to an apparatus and a method for producing three-dimensional work pieces by irradiating layers of a raw material powder with electromagnetic or particle radiation.

Selective laser melting or laser sintering is an additive layering process by which pulverulent, in particular metallic and/or ceramic raw materials can be processed to three-dimensional work pieces of complex shapes. To that end, a raw material powder layer is applied onto a carrier and subjected to laser radiation in a site selective manner in dependence on the desired geometry of the work piece that is to be produced. The laser radiation penetrating into the powder layer causes heating and consequently melting or sintering of the raw material powder particles. Further raw material powder layers are then applied successively to the layer on the carrier that has already been subjected to laser treatment, until the work piece has the desired shape and size. Selective laser melting or laser sintering can be used in particular for the production of prototypes, tools, replacement parts or medical prostheses, such as, for example, dental or orthopaedic prostheses, on the basis of CAD data.

An apparatus for producing moulded bodies from pulverulent raw materials by selective laser melting is described, for example, in EP 1 793 979 B1. The prior art apparatus comprises a process chamber which accommodates a plurality of carriers for the shaped bodies to be manufactured. A powder layer preparation system comprises a powder reservoir holder that can be moved to and fro across the carriers in order to apply a raw material powder to be irradiated with a laser beam onto the carriers. The process chamber is connected to a protective gas circuit comprising a supply line via which a protective gas may be supplied to the process chamber in order to establish a protective gas atmosphere within the process chamber.

An irradiation unit which may be employed in an apparatus for producing three-dimensional work pieces by irradiating pulverulent raw materials is described in EP 2 335 848 A1. The irradiation unit comprises a laser source and an optical unit. The optical unit which is supplied with a laser beam emitted by the laser source comprises a beam expander and a scanner unit. Within the scanner unit, diffractive optical elements which may be folded into the beam path in order to split the laser beam into a plurality of laser sub-beams are arranged in front of a deflection mirror for deflecting the laser sub-beams. The laser beam or the laser sub-beams emitted by the scanner unit are supplied to an objective lens which is designed in the form of an f-theta lens.

The invention is directed at the object of providing an apparatus and a method, which allow a precise monitoring of a building process for generating a three-dimensional work piece by irradiating layers of a raw material powder with electromagnetic or particle radiation.

This object is addressed by an apparatus as defined in claim 1 and a method as defined in claim 8.

An apparatus for producing three-dimensional work pieces comprises a carrier adapted to receive a raw material powder. The carrier may be disposed in a process chamber which may be sealable against the ambient atmosphere, in order to be able to maintain a controlled atmosphere, in particular an inert atmosphere within the process chamber. The carrier may be a rigidly fixed carrier. Preferably, however, the carrier is designed to be displaceable in vertical direction so that, with increasing construction height of a work piece, as it is built up in layers from the raw material powder, the carrier can be moved downwards in the vertical direction. The raw material powder preferably is a metallic powder, in particular a metal alloy powder, but may also be a ceramic powder or a powder containing different materials. The powder may have any suitable particle size or particle size distribution. It is, however, preferable to process powders of particle sizes <100 μm. The raw material powder may be applied onto the carrier by means of a suitable powder application device The apparatus further comprises an irradiation unit for selectively irradiating electromagnetic or particle radiation onto the raw material powder applied onto the carrier in order to produce a work piece made of the raw material powder by a generative layer construction method. The irradiation unit comprises a radiation source and a plurality of optical elements. The radiation source may comprise a laser source, for example a diode pumped Ytterbium fibre laser.

Further, the apparatus comprises a detection device which is arranged so as to be capable of detecting an operational parameter of a radiation beam emitted by the radiation source and having passed at least one optical element of the irradiation unit. The operational parameter detected by means of the detection device thus is influenced by both the radiation source and the at least one optical element of the irradiation unit which is passed by the radiation beam before the operational parameter of the radiation beam is detected. Thus, the detection device allows to not only monitor the operational state of the radiation source, but also, at least to a certain extent, monitor the functioning of the at least one optical element of the irradiation unit.

Preferably, the detection device is adapted to detect an output power of the radiation beam. The output power of the radiation beam is influenced by the radiation source itself, but also by the at least one optical element of the irradiation unit. For example, the output power of the radiation beam detected by the detection device may decrease as a result of a defect of the radiation source, but also due to a defect or a contamination of the at least one optical element of the irradiation unit. Thus, the output power of the radiation beam is an operational parameter which is in particular suitable to monitor not only the operational state of the radiation source, but also the functioning of the at least one optical element of the irradiation unit.

In a preferred embodiment of the apparatus, the detection device is adapted to continuously detect the output power of the radiation beam. This allows to particularly precisely monitor the operation of the radiation source and the at least one optical element of the irradiation unit. For example, a slight but continuous decrease in the output power of the radiation beam over time may be interpreted as an indication that the performance of the radiation source deteriorates or that the at least one optical element of the irradiation unit gets increasingly contaminated. Hence, regular service intervals as well as exceptional maintenance operations may be planned with a high accuracy and reliability. As a consequence, down-times of the apparatus may be minimized or even avoided.

Preferably, the detection device is adapted to output a deleted value of the operational parameter of the radiation beam to a control unit. The control unit may be adapted to determine whether the detected value is within a set range. The set range may be a fixed set range defined, for example, by the manufacturer of the apparatus. It is, however, also conceivable, that the set range may be input into the control unit by a user, for example in dependence on the desired quality of the work piece to be produced by means of the apparatus. Furthermore, the control unit may be adapted to output a message to a user interface in case it is determined that the detected value is outside the set range. Alternatively or additionally thereto, the control unit may also simply output a diagram depicting the detected value as well as the set range to a user interface so that a user may manually evaluate the output of the control unit.

Preferably, however, the control unit is adapted to output a message to a user interface which includes at least one of an indication of the time, when the detected value was outside the set range, an indication of the time period, how long the detected value was outside the set range, and an indication of the layer of the work piece produced according to a generative layer construction method wherein, during the production process, the detected value was outside the set range. After completion of a building process for generating the three-dimensional work piece, the message may be analyzed and the reason for the problem report may be searched and found. Moreover, in dependence on the significance of the fault, the generated work piece may be declared to still satisfy the quality requirements or may be segregated.

The irradiation unit preferably comprises a beam splitter arranged in a beam path of the radiation beam emitted by the radiation source after having passed the at least one optical element of the irradiation unit. The beam splitter preferably is adapted to direct a sub-beam of the radiation beam to the detection device. The beam splitter may be arranged within the irradiation unit as desired, i.e. in a position which allows a desired optical dement of the irradiation unit to be monitored together with the radiation source.

The at least one optical element of the irradiation unit which is passed by the radiation beam emitted by the radiation source before the operational parameter of the radiation beam is detected by means of the detection device may be a focusing optic. In this case, the focusing optic preferably comprises a 3D-scan objective. The irradiation unit then may further comprise a scanner unit which, however, preferably is arranged in the beam path of the radiation beam after the operational parameter of the radiation beam has been detected.

As an alternative, the at least one optical element of the irradiation unit which is passed by the radiation beam emitted by the radiation source before the operational parameter of the radiation beam is detected by means of the detection device may be a beam expander. In this case, the irradiation unit preferably further comprises a scanner unit which is disposed in the beam path of the radiation beam emitted by the radiation source after a desired operational parameter of the radiation beam has been detected. Furthermore, the irradiation unit may comprise a focusing optic which may, for example, comprise a f-theta lens. The focusing optic preferably is arranged in the beam path of the radiation beam behind the scanner unit.

In a method for producing three-dimensional work pieces, a layer of raw material powder is applied onto a carrier. The raw material powder applied onto the carrier, by means of an irradiation unit, is selectively irradiated with electromagnetic or particle radiation in order produce a work piece made of the raw material powder on the carrier by a generative layer construction method. The irradiation unit comprises a radiation source and a plurality of optical elements. An operational parameter of a radiation beam emitted by the radiation source and having passed at least one optical element of the irradiation unit is detected by means of a detection device.

Preferably, the detection device detects an output power of the radiation beam. In particular, the detection device continuously detects the desired operational parameter of the radiation beam, in particular the output power of the radiation beam.

The detection device may output a detected value of the operational parameter of the radiation beam to a control unit. The control unit then may determine whether the detected value is within a set range and output a message to a user interface in case it is determined that the detected value is outside the set range.

Preferably, the control device outputs a message to a user interface which includes at least one of an indication of the time, when the detected value was outside the set range, an indication of the time period, how long the detected value was outside the set range, and an indication of the layer of the work piece produced according to a generative layer construction method wherein, during the production process, the detected value was outside the set range.

The irradiation unit may comprise a beam splitter arranged in a beam path of the radiation beam emitted by the radiation source after having passed the at least one optical element of the irradiation unit. The beam splitter may be adapted to direct a sub-beam of die radiation beam to the detection device.

In the method for producing three-dimensional work pieces, the at least one optical element of the radiation unit which is passed by the radiation beam emitted by the ration source before the operational parameter of the radiation beam is detected by means of the detection device may be a focusing optic.

Alternatively thereto, the at least one optical element of the irradiation unit which is passed by the radiation beam emitted by the radiation source before the operational parameter of the radiation beam is detected by means of the detection device may be a beam expander.

Figure 2:
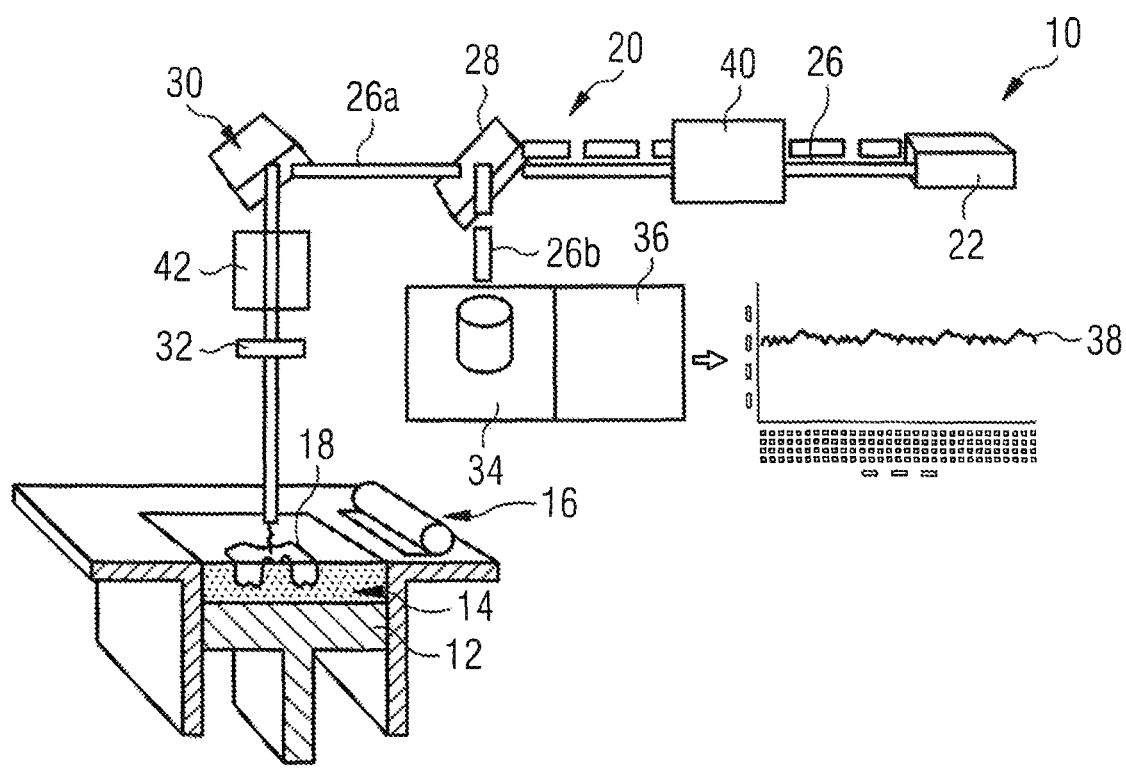

Preferred embodiments of the invention now are described in greater detail with reference to the appended schematic drawings wherein FIG. 1 shows a first embodiment of an apparatus for producing three-dimensional work pieces by selectively irradiating electromagnetic or particle radiation onto a raw material powder and FIG. 2 shows a second embodiment of an apparatus for producing three-dimensional work pieces by selectively irradiating electromagnetic or particle radiation onto a raw material powder.

FIG. 1 shows a first embodiment of an apparatus 10 for producing three-dimensional work pieces by selective laser melting (SLM®). The apparatus 10 comprises a carrier 12 onto which layers of a raw material powder 14 may be applied by means of a powder application device 16. The carrier 12 is designed to be displaceable in a vertical direction so that with increasing construction height of a work piece 18, as it is build up in layers from the raw material powder on the carrier 12, the carrier 12 can be moved downwards in the vertical direction. The carrier 12 is arranged in a process chamber which is not shown in the drawings. The process chamber is sealable against the ambient atmosphere.

The apparatus further comprises an irradiation unit 20 for selectively irradiating the raw material powder 14 applied onto the carrier 12. By means of the irradiation system 20, the raw material powder may be subjected to radiation in a site-selective manner independent of the desired geometry of the work piece that is to be produced. The irradiation unit 20 comprises a radiation source 22. The radiation source 22 may be designed in the form of a laser source emitting laser light at a wavelength of approximately 1064 nm.

Further, the irradiation unit 20 of the apparatus 10 depicted in FIG. 1 comprises a focusing optic 24. The focusing optic 24 comprises a 3D-scan objective and is arranged in a beam path of a radiation beam 26 emitted by the radiation source 22 in front of a beam splitter 28. The beam splitter 28 splits the radiation beam 26 exiting focusing optic 24 into two sub-beams 26a, 26b.

A first sub-beam 26a, behind the beam splitter 28, is directed to a scanner unit comprising a deflection mirror 30. Further, the scanner unit may comprise one or more diffractive optical element(s) which may be folded into the beam path and which may be arranged in front of or behind of the deflection mirror 30. Finally, the sub-beam 26a, through a safety glass 32, is directed into the process chamber and thus onto the raw material powder 14 applied onto the carrier 12.

Contrary thereto, a second sub-beam 26b is directed to a detection device 34. The detection device 34 is adapted to continuously detect an output power of the sub-beam 26b which corresponds to the output power of the radiation beam 26 emitted by the radiation source 22 after having passed the focusing optic 24. Hence, the detection device 34 is arranged so as to be capable of detecting an operational parameter of the radiation beam 26 emitted by the radiation source 22 after the radiation beam 26 has passed at least one optical element, namely the focusing optic 24, of the irradiation unit 20.

The detection device 34 outputs the continuously detected values of the output powder of the sub-beam 26b to a control unit 36. The control unit 36 outputs a diagram 38 depicting the measured values of the output power of the sub-beam 26b over time to a user interface. The user interface may, for example, comprise a screen and a user operable control panel. A user may thus, in real-time, monitor the operational state of both the radiation source 32 and the focusing optic 24, since an unexpected decrease or increase of the output power of the sub-beam 26b which is detected by means of the detection device 34 may be caused by either a malfunctioning of the radiation source 22 or a defect or contamination of the focusing optic 24.

Further, the control unit 36 determines whether the detected values of the output power of the sub-beam 26b are within a set range. In case the detected values are outside the set range, the control unit 36 outputs a message to the user interface. In particular, the control device 36 outputs a message including an indication of the time, when the detected values were outside the set range, an indication of the time period, how long the detected values were outside the set range, and an indication of the layer of the work piece 18 produced according to a generative layer construction method wherein, during the production process, the detected values were outside the set range.

Based on the data output by the control device 36, after completion of the building process for producing the work piece 18, a user may immediately analyze the operational state of the radiation source 22 and the focusing optic 24 and plan and perform service work as needed. In addition, the data output by the control unit 36 may be used for planning regular service intervals with a high reliability, thus reducing the down-times of the apparatus 10.

The embodiment of an apparatus 10 which is depicted in FIG. 2 differs from the arrangement according to FIG. 1 in that the irradiation unit 20 has a different structure. In particular, the irradiation unit 20, in the apparatus 10 according to FIG. 2, comprises a beam expander 40 which is arranged in the beam path of the radiation beam 26 between the radiation source 22 and the beam splitter 28. A scanning unit which may be designed as described above with reference to the apparatus 10 according to FIG. 1 is placed in the beam path behind the beam splitter 28 and thus is supplied wit the radiation sub-beam 26a passing through the beam splitter 28. Finally, the irradiation unit 20 comprises a focusing optic 42 which is arranged in the beam path of sub-beam 26a behind the scanner unit. The focusing unit 42 comprises a f-theta object lens.

Thus, in the apparatus 10 according to FIG. 2, the detected values of the output power of the radiation sub-beam 26b are indicative of the operational state of the radiation source 22 and the beam expander 40. Otherwise, the structure and the mode of operation of the apparatus 10 depicted in FIG. 2 correspond to the structure and the mode of operation of the arrangement according to FIG. 1.

The invention claimed is:

1. Apparatus for producing three-dimensional work pieces, the apparatus comprising:
   a carrier adapted to receive a raw material powder,
   an irradiation unit for selectively irradiating electromagnetic or particle radiation onto the raw material powder applied onto the carrier in order to produce a work piece made of said raw material powder on the carrier by a generative layer construction method, the irradiation unit comprising a radiation source and a plurality of optical elements, and
   a detection device which is arranged so to be capable of detecting an operational parameter of a radiation beam emitted by the radiation source after having passed through at least one optical element of the irradiation unit and subsequently a beam splitter, wherein the at least one optical element includes a focusing optic or a beam expander.

2. The Apparatus according to claim 1,
   wherein the detection device is adapted to continuously detect an output power of the radiation beam.

3. The Apparatus according to claim 1,
   wherein the detection device is adapted to output a detected value of the operational parameter of the radiation beam to a control unit, and wherein the control unit is adapted to determine whether the detected value is within a set range and to output a message to a user interface in case it is determined that the detected value is outside the set range.

4. The Apparatus according to claim 3, wherein the control unit is adapted to output a message to a user interface which includes at least one of an indication of the time, when the detected value was outside the set range, an indication of the time period, how long the detected value was outside the set range, and an indication of the layer of the work piece produced according to a generative layer construction method wherein, during the production process, the detected value was outside the set range.

5. The Apparatus according to claim 1, wherein the irradiation unit comprises a beam splitter arranged in a beam path of the radiation beam emitted by the radiation source after having passed at least one optical element of the irradiation unit, the beam splitter being adapted to direct a sub-beam of the radiation beam to the detection device.

6. Method for producing three-dimensional work pieces, the method comprising the steps of:
- applying a raw material powder onto a carrier,
- selectively irradiating electromagnetic or particle radiation onto the raw material powder applied onto the carrier by means of an irradiation unit in order to produce a work piece made of said raw material powder on the carrier by a generative layer construction method, the irradiation unit comprising a radiation source and a plurality of optical elements, and
- detecting an operational parameter of a radiation beam emitted by the radiation source by means of a detection device after having passed through at least one optical element of the irradiation unit and subsequently a beam splitter, wherein the at least one optical element includes a focusing optic or a beam expander.

7. The Method according to claim 6,
wherein the detection device continuously detects an output power of the radiation beam.

8. The Method according to claim 6,
wherein the detection device outputs a detected value of the operational parameter of the radiation beam to a control unit, and wherein the control unit determines whether the detected value is within a set range and outputs a message to a user interface in case it is determined that the detected value is outside the set range.

9. The Method according to claim 8, wherein the control unit outputs a message to a user interface which includes at least one of an indication of the time, when the detected value was outside the set range, an indication of the time period, how long the detected value was outside the set range, and an indication of the layer of the work piece produced according to a generative layer construction method wherein, during the production process, the detected value was outside the set range.

10. The Method according to claim 6, wherein the irradiation unit comprises a beam splitter arranged in a beam path of the radiation beam emitted by the radiation source after having passed at least one optical element of the irradiation unit, the beam splitter being adapted to direct a sub-beam of the radiation beam to the detection device.

* * * * *